US012730641B2

(12) United States Patent
Randall et al.

(10) Patent No.: US 12,730,641 B2
(45) Date of Patent: Sep. 8, 2026

(54) CONTENTION HINT INSTRUCTION

(71) Applicant: Arm Limited, Cambridge (GB)

(72) Inventors: Joshua Randall, Austin, TX (US); Rajesh Shashi Kumar, Austin, TX (US); Eric Ola Harald Liljedahl, Stockholm (SE); Tiago Rogerio Muck, Austin, TX (US)

(73) Assignee: Arm Limited, Cambridge (GB)

( * ) Notice: Subject to any disclaimer, the term of this patent is extended or adjusted under 35 U.S.C. 154(b) by 5 days.

(21) Appl. No.: 19/040,081

(22) Filed: Jan. 29, 2025

(65) Prior Publication Data

US 2026/0219885 A1 Jul. 30, 2026

(51) Int. Cl.
*G06F 9/30* (2018.01)

(52) U.S. Cl.
CPC ...... *G06F 9/30145* (2013.01); *G06F 9/30043* (2013.01); *G06F 9/30047* (2013.01)

(58) Field of Classification Search
CPC ............. G06F 9/30043; G06F 9/30047; G06F 9/30145
See application file for complete search history.

(56) References Cited

U.S. PATENT DOCUMENTS

2010/0332801 A1 12/2010 Fryman et al.
2012/0317362 A1* 12/2012 Hendry ............... G06F 12/0831 711/146
2016/0085656 A1* 3/2016 Braun ................. G06F 11/0715 714/38.11
2017/0286421 A1* 10/2017 Hayenga ................. G06F 21/75
2022/0206945 A1 6/2022 Beckmann et al.
2025/0209007 A1* 6/2025 Horsnell ............. G06F 12/0828
2025/0258675 A1* 8/2025 Kiss ...................... G06F 9/3004

FOREIGN PATENT DOCUMENTS

WO 2019141995 A1 7/2019

OTHER PUBLICATIONS

"Do near or far atomics give the best performance on Neoverse systems?", Arm, Article ID: KA004706, https://developer.arm.com/documentation/ka004706/1-0/?lang=en , Mar. 6, 2023, 4 pages.
International Search Report and Written Opinion of the International Searching Authority for PCT/GB2026/050053 mailed Feb. 18, 2026, 14 pages.
ARM, "Application Note 179 Cortex-M3 Embedded Software Development" Mar. 2007, 24 pages.

* cited by examiner

*Primary Examiner* — Zachary K Huson
(74) *Attorney, Agent, or Firm* — NIXON & VANDERHYE P.C.

(57) ABSTRACT

An apparatus comprises instruction decoding circuitry configured to decode instructions of a program thread executed by a given processor core; and load/store control circuitry configured to select a target point of a memory system hierarchy at which to allocate data for a target cache line specified by a load/store instruction decoded by the instruction decoding circuitry. The load/store control circuitry is configured to select the target point of the memory system hierarchy depending on whether the load/store instruction is associated with a memory contention hint provided by a contention hint instruction decoded by the instruction decoding circuitry, the memory contention hint indicating that the target cache line is likely to be subject to contention for access from multiple threads of processing.

20 Claims, 6 Drawing Sheets

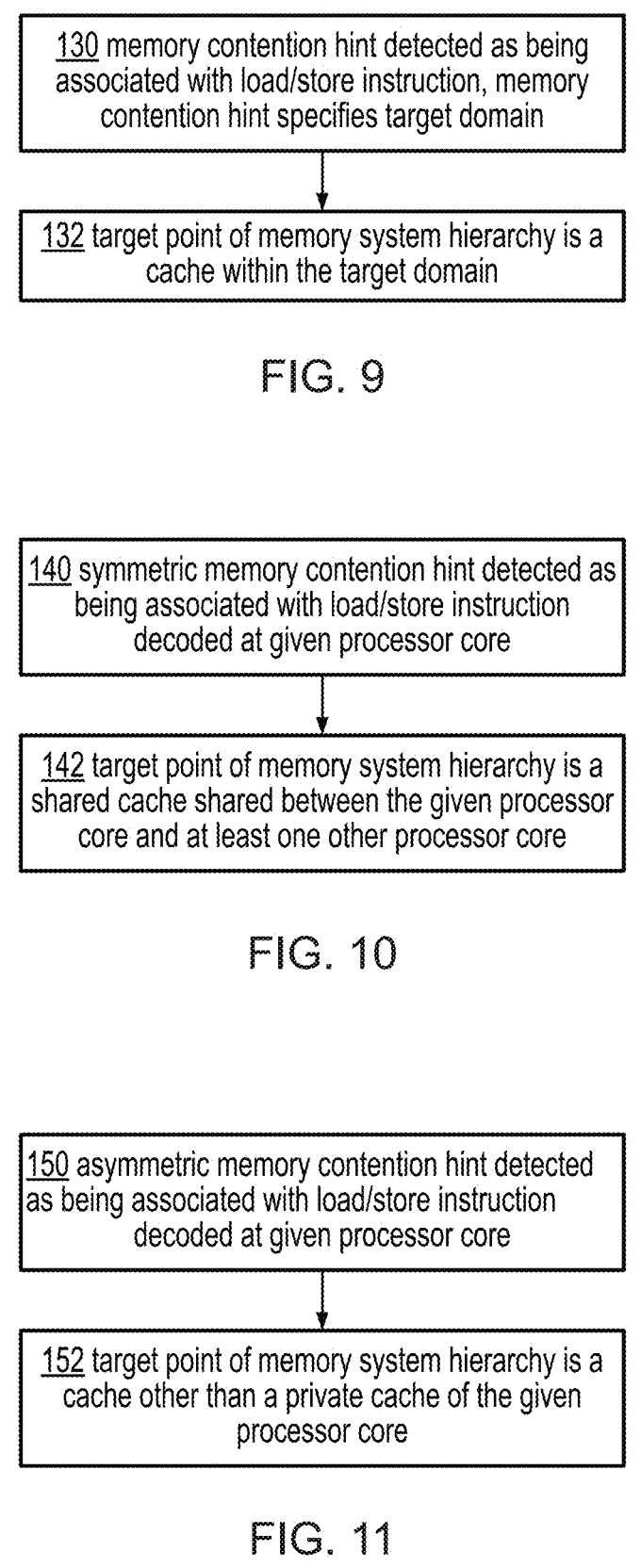

130 memory contention hint detected as being associated with load/store instruction, memory contention hint specifies target domain 132 target point of memory system hierarchy is a cache within the target domain

FIG. 9

140 symmetric memory contention hint detected as being associated with load/store instruction decoded at given processor core 142 target point of memory system hierarchy is a shared cache shared between the given processor core and at least one other processor core

FIG. 10

150 asymmetric memory contention hint detected as being associated with load/store instruction decoded at given processor core 152 target point of memory system hierarchy is a cache other than a private cache of the given processor core

FIG. 11

CONTENTION HINT INSTRUCTION

BACKGROUND

Technical Field

The present technique relates to the field of data processing.

Technical Background

Some processing workloads may involve access to shared data by multiple threads running on respective processor cores (e.g. CPUs). In case of memory contention (multiple threads or processors concurrently accessing the same shared data, e.g. cache line, where at least one of the accesses involves a write to the shared data), the software may need to manage updates to the data so that respective updates to the shared data by different threads are synchronised. Such synchronisation techniques may have an impact on processing performance particularly in cases of high contention between many threads seeking to access the same data.

SUMMARY

At least some examples of the present technique provide an apparatus comprising: instruction decoding circuitry configured to decode instructions of a program thread executed by a given processor core; and load/store control circuitry configured to select a target point of a memory system hierarchy at which to allocate data for a target cache line specified by a load/store instruction decoded by the instruction decoding circuitry, wherein the load/store control circuitry is configured to select the target point of the memory system hierarchy depending on whether the load/store instruction is associated with a memory contention hint provided by a contention hint instruction decoded by the instruction decoding circuitry, the memory contention hint indicating that the target cache line is likely to be subject to contention for access from multiple threads of processing.

At least some examples of the present technique provide a system comprising: the apparatus described above, implemented in at least one packaged chip; at least one system component; and a board, wherein the at least one packaged chip and the at least one system component are assembled on the board.

At least some examples of the present technique provide a chip-containing product comprising the system described above, wherein the system is assembled on a further board with at least one other product component.

At least some examples of the present technique provide a non-transitory computer-readable medium storing computer-readable code for fabrication of an apparatus comprising: instruction decoding circuitry configured to decode instructions of a program thread executed by a given processor core; and load/store control circuitry configured to select a target point of a memory system hierarchy at which to allocate data for a target cache line specified by a load/store instruction decoded by the instruction decoding circuitry, wherein the load/store control circuitry is configured to select the target point of the memory system hierarchy depending on whether the load/store instruction is associated with a memory contention hint provided by a contention hint instruction decoded by the instruction decoding circuitry, the memory contention hint indicating that the target cache line is likely to be subject to contention for access from multiple threads of processing.

At least some examples of the present technique provide a method comprising: decoding instructions of a program thread executed by a given processor core; and in response to a load/store instruction of the program thread, selecting a target point of a memory system hierarchy at which to allocate data for a target cache line specified by the load/store instruction, wherein the target point of the memory system hierarchy is selected depending on whether the load/store instruction is associated with a memory contention hint provided by a contention hint instruction, the memory contention hint indicating that the target cache line is likely to be subject to contention for access from multiple threads of processing.

Further aspects, features and advantages of the present technique will be apparent from the following description of examples, which is to be read in conjunction with the accompanying drawings.

BRIEF DESCRIPTION OF THE DRAWINGS

FIG. 6 illustrates a method for processing a load/store instruction based on whether the load/store instruction is associated with a memory contention hint provided by the contention hint instruction;

FIG. 7 illustrates a method for processing a store instruction, in an example where the memory contention hint is a shared update hint;

FIG. 9 illustrates a method for processing a load/store instruction, for an example where the memory contention hint specifies a target domain;

FIG. 10 illustrates a method for processing a load/store instruction, for an example where the memory contention hint is a symmetric memory contention hint;

FIG. 11 illustrates a method for processing a load/store instruction, for an example where the memory contention hint is an asymmetric memory contention hint.

DESCRIPTION OF EXAMPLES

Figure 1:
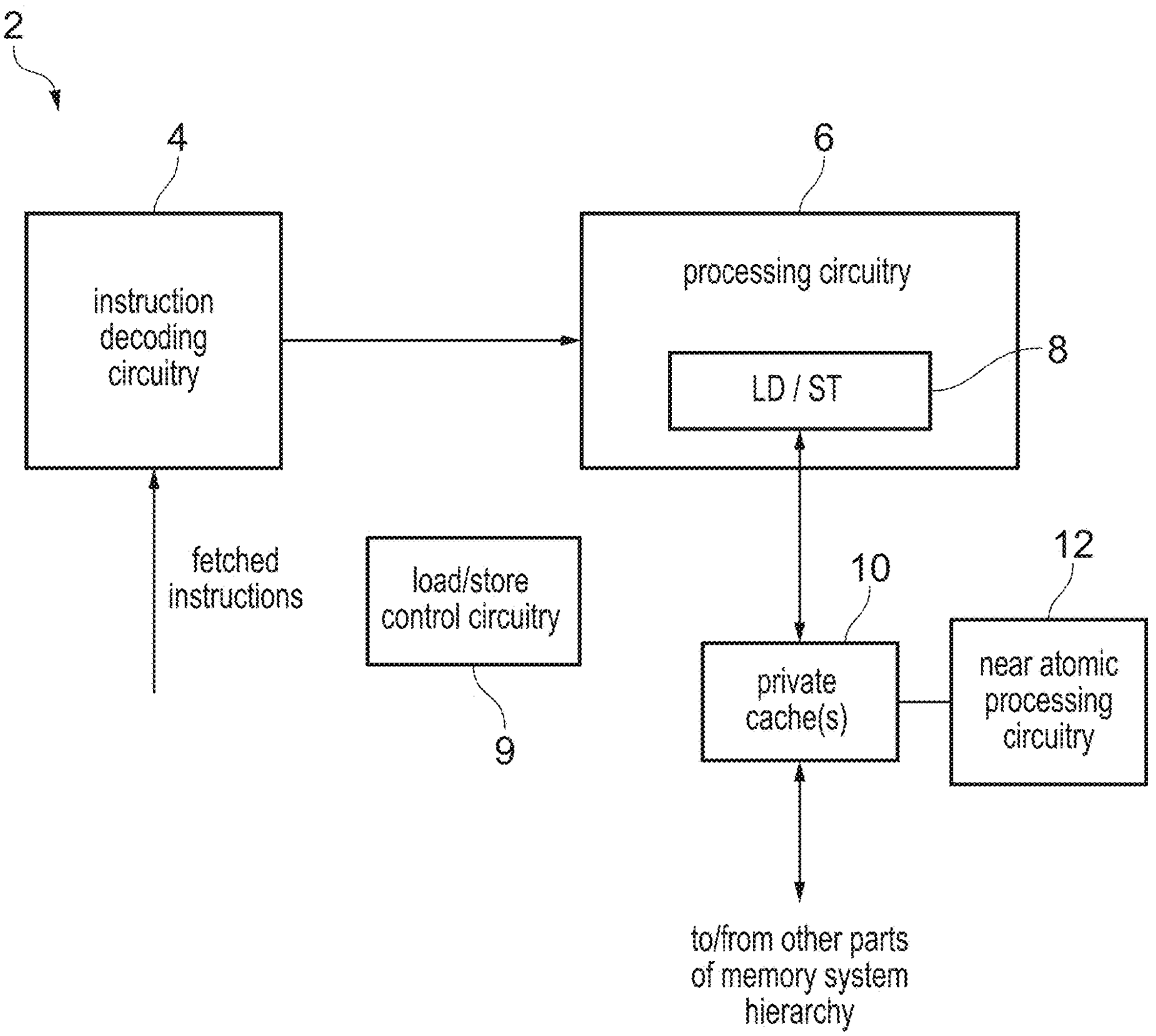
FIG. 1 illustrates an apparatus comprising instruction decoding circuitry and load/store control circuitry.

The inventors have recognised that the preferred way of handling load/store operation to a target cache line triggered by a load/store instruction in a given program thread can be highly dependent on whether there is contention for access to the target cache line from other threads. For example, if there is very little contention, performance may be improved by the processor core executing the given thread pulling the data for the target cache line into its private cache, so that it can be accessed faster on subsequent accesses. If there is a greater level of contention for access to the given cache line, it may be preferable for the data to be allocated into a shared cache or other cache deeper into the memory system, which although slower to access for a single thread can benefit performance for multiple threads because it reduces latency for accesses by other threads (particularly if the other threads are requesting unique access to the data to update the location), and avoids delay and waste of memory system bandwidth that would be incurred if each of the contending threads repeatedly tried to request that the data is allocated into its private cache, which can lead to the cache line ping-ponging between caches of multiple processor cores as the threads on those cores keep requesting the data and causing each other's cache entries for the cache line to be invalidated. However, detecting which approach is best at runtime using hardware micro-architecture can be relatively difficult, as it takes time to learn from observing snoop requests or cache invalidations which addresses may be subject to contention (so any performance improvements associated with switching approach may be delayed until the warm up period while the pattern is being learned is over), and as address access behaviour may be transient, there is a risk that by the time the hardware is confident enough in the access patterns, the address access behaviour may have changed and so the learned patterns are no longer relevant. Hence, in typical processor systems it is likely that many load/store operations are handled using a technique which is less preferred and harms performance, as it cannot be detected by the hardware whether a given cache line to be accessed by one thread is likely to be subject to contention from other threads. This can harm overall processing performance.

In the examples below, an apparatus comprises instruction decoding circuitry configured to decode instructions of a program thread executed by a given processor core, and load/store control circuitry configured to select a target point of a memory system hierarchy at which to allocate data for a target cache line specified by a load/store instruction decoded by the instruction decoding circuitry. The load/store control circuitry is configured to select the target point of the memory system hierarchy depending on whether the load/store instruction is associated with a memory contention hint provided by a contention hint instruction decoded by the instruction decoding circuitry. The memory contention hint indicates that the target cache line is likely to be subject to contention for access from multiple threads of processing.

Hence, a contention hint instruction is provided, which allows a software developer or compiler to hint that the target cache line to be accessed by an associated load/store instruction is likely to be subject to contention for access from multiple threads of processing. This recognises that, typically, the software developer or compiler will know which memory accesses are likely to involve contention and which are not. For example, program threads involving access to shared memory may include lock control memory accesses to a lock control variable which is used by the threads to negotiate the right to exclusively access an associated memory system resource. Those lock control memory accesses are likely to be highly contended as multiple threads attempt to read the lock to check its status and/or write to the lock to claim the exclusive right to access the associated memory system resource. In contrast, other load/store instructions may be known in advance to relate to variables which are unlikely to be needed by multiple threads (e.g. accesses to thread-private data which will not be shared with other threads). By deciding (e.g. at compile time) whether or not to include a contention hint instruction in the executed sequence of instructions, a compiler can provide the hardware with hint information that indicates that a particular load/store instruction is likely to involve contention, which can help the hardware choose a more appropriate technique for handling the corresponding load/store operation than would be possible in the absence of the hint. The load/store control circuitry can use the presence or absence of the memory contention hint associated with a given load/store instruction to determine the target point of the memory system hierarchy at which the given load/store instruction should cause data to be allocated. Hence, the architectural support for the contention hint instruction enables software to provide hardware with better information on whether contention is likely for a given load/store instruction, so that a more informed decision can be made on the point of the memory system hierarchy at which to allocate data for the corresponding load/store operation, enabling improvements in average case processing performance in comparison to processors which do not support the contention hint instruction.

The memory contention hint provided by the contention hint instruction may provide a hint about the expected behaviour of at least one other thread, other than the thread containing the contention hint instruction. This contrasts with hints which solely provide information about the expected behaviour of the thread containing the hint instruction, such as non-temporal hints indicating that data accessed by one thread is unlikely to be needed again by that same thread.

It will be appreciated that, in some implementations, the contention hint may not be the only factor taken into account in selecting the target point at which the data for the target cache line is allocated. For example, in some implementations, other information, such as the existing location at which the target cache line is located, or the current coherency state of the target cache line, could also be considered. Hence, it will be appreciated that the software hint provided by the contention hint instruction could, if desired, be combined with other information to provide a heuristic for determining the location at which data for the target cache line should be allocated.

The load/store control circuitry can be implemented at different locations in a processing system. For example, the load/store control circuitry could include circuitry located at any one or more of: a load/store unit for executing load/store instructions within a given processor core; cache control circuitry associated with a given private cache or system cache; system interconnect circuitry located at a memory system interconnect; and/or memory controller circuitry controlling access to a particular memory storage array. In some cases, the load/store control circuitry may include distributed circuit logic located at two or more distinct locations within a data processing system, which collectively acts to control the point of the memory system hierarchy at which data for a target cache line to be accessed by a load/store operation is allocated. The memory contention hint can be an input to such load/store control circuitry to influence the decision on selecting the target point of the memory system hierarchy.

The memory system hierarchy may comprise a number of levels of storage unit, including for example, one or more levels of private cache associated with the given processor core; and one or more levels of shared cache shared between the given processor core and at least one other core (e.g. the shared cache could be a cluster cache shared between multiple cores but not the entire processing system, or a system cache implemented at a system interconnect). In some cases, the memory system hierarchy may also include peer caches which are private caches associated with other processor cores or caching agents or shared caches which are not associated with the given processor core, and/or memory controller caches implemented at a memory controller. Hence, there are a variety of points of the memory system at which data for a given cache line could be allocated, which have varying access latencies from the point of view of the given processor core and other caching agents.

In some examples, the memory contention hint comprises a shared update hint (alternatively called a concurrent update hint or update contention hint) indicating that the target cache line is likely to be subject to updates from multiple threads of processing. For a store instruction decoded by the instruction decoding circuitry, the load/store control circuitry may determine, based (at least) on whether the store instruction is associated with the shared update hint, the target point of the memory system hierarchy at which to apply an update to the target cache line. Hence, the contention hint instruction provides software with a mechanism to indicate to the hardware that a particular memory access is to a location that is likely to be subsequently updated by other threads executing on other processor cores, and so hardware can deduce that there can be a performance benefit to ensuring that subsequent memory updates to the location may be performed with lower latency (e.g. by applying the update at a point of the memory system hierarchy shared with other processor cores, rather than in a private cache of the processor core executing the thread including the contention hint instruction).

In some examples, the load/store instruction comprises a load instruction, for which a load/store operation performed in response to the load/store instruction comprises reading the target cache line.

In some examples, the load/store instruction comprises a store instruction, for which the load/store operation comprises writing to the target cache line.

In some examples, the load/store instruction comprises a load/ALU (arithmetic/logical unit), for which the load/store operation comprises both a read to the target cache line, and an arithmetic and/or logical operation performed on the value read from the target cache line.

In some examples, the load/store instruction comprises an ALU/store instruction, for which the load/store operation comprises both an arithmetic and/or logical operation to generate a modified value for the target cache line, and a write of the modified value to the target cache line.

In some examples, the load/store instruction comprises a non-atomic read-modify-write instruction, for which the load/store operation comprises a non-atomic read-modify-write operation to read a value from a given cache line, modify the read value of the given cache line (e.g. by replacing it with a swap value or by performing an arithmetic/logical operation on the read value to generate a modified value), and write the modified value back to the given cache line, but where there is no guarantee that the read, modify and write steps are performed atomically so as to be observed as being performed indivisibly.

In some examples, the load/store instruction comprises an atomic read-modify-write instruction for controlling performing an atomic read-modify-write operation. An atomic read-modify-write operation comprises reading a value from a given cache line, modifying the read value of the given cache line (e.g. by replacing it with a swap value or by performing an arithmetic/logical operation on the read value to generate a modified value), and writing the modified value back to the given cache line, with the write being either unconditional or, for some examples, conditional on the read value satisfying a condition. The atomic nature of the operation means that the read, modify and write steps should be observed as being performed indivisibly. The memory contention hint can be particularly useful in relation to such atomic read-modify-write instructions, because they are often used to access lock control variables used to negotiate exclusive access to an associated memory system resource, so are likely to be used in scenarios involving memory contention.

For example, some systems may implement atomic processing circuitry which can apply atomic read-modify-write updates to memory system data at a location associated with a cache or other memory system component, rather than needing the data to be read into a register of a processor core to allow the modification to be performed using the arithmetic/logic unit of the processor core. Systems may include two or more instances of such atomic processing circuitry at different parts of the memory system. The memory contention hint described above can be useful for determining which instance of atomic processing circuitry to use to apply the atomic read-modify-write update required by a given atomic read-modify-write instruction. The hint provides an indication of expected behaviour of other threads other than the thread which includes the contention hint instruction.

Hence, in some examples, the load/store control circuitry is configured to determine, based on whether the atomic read-modify-write instruction is associated with the memory contention hint, whether to perform the atomic read-modify-write operation using near atomic processing circuitry associated with the given processor core or far atomic processing circuitry shared with, or associated with, at least one other processor core. Use of far atomic processing circuitry, where the read-modify-write operation can be performed at a location deeper into the memory system, is slower in the case of single-threaded access to the given cache line, but can benefit performance in the case of higher contention. However, in typical systems it can be difficult for hardware to determine when the far atomic processing circuitry will benefit performance. In contrast, in the examples discussed below, the hardware of the load/store control circuitry can determine, based on whether a memory contention hint has been associated with a given atomic read-modify-write instruction, whether there is likely to be contention, and can then select whether the instruction should be processed using the near atomic processing circuitry closer to the given processor core or the far atomic processing circuitry further from the given processor core. The far atomic processing circuitry could be implemented, for example, at a shared cache or point of coherence shared between multiple processor cores, or could be the near atomic processing circuitry of another processor core (which can be considered "far" atomic processing circuitry because, relative to the processor core executing the thread that includes the atomic read-modify-write instruction, the other core's near atomic processing circuitry is further away (slower to access) than the near atomic processing circuitry of the given processor core itself).

In some examples, in response to detecting that the memory contention hint is associated with the atomic read-modify-write instruction when the target cache line is not already held in a unique coherency state in the private cache of the given processor core, the load/store control circuitry is configured to select the far atomic processing circuitry for performing the atomic read-modify-write operation. If the atomic read-modify-write instruction is not associated with the memory contention hint, then either the near processing circuitry can be selected by default, or if any micro-architectural hardware mechanism is supported for detecting cache lines which are subject to high contention, the choice of which atomic processing circuitry to use for the atomic read-modify-write instruction could depend on a prediction made by the micro-architectural hardware mechanism. Either way, by preferring use of far atomic processing circuitry in cases where the memory contention hint has been provided by software (at least when the target cache line is not already held in the private cache of the given processor core in a unique coherency state), this can provide improved average case performance compared to a system which does not support the contention hint instruction, as it is likely that the determination based on the hint instruction will give higher accuracy of predicting which approach is best for a given load than would be possibly using the micro-architectural hardware mechanism.

The unique coherency state may be a state in which data for a given cache line held in a private cache of a given processor core may be modified by the given processor core without issuing any coherence transaction to the memory system to check for whether private caches for other caching agents also hold data for the given cache line. In cases where the memory contention hint is associated with the atomic read-modify-write instruction but the target cache line is already held in a unique coherency state in the private cache of the given processor core, it may be preferable to use the near atomic processing circuitry for processing the atomic read-modify-write operation, because that will tend to reduce latency when there is no overhead needed for obtaining the right to modify the data as the data is already held in the unique state.

In some examples, the load/store control circuitry is configured to select, depending on whether the load/store instruction is associated with the memory contention hint, a target cache at which to allocate the data for the target cache line. For example, in response to detecting that the memory contention hint is associated with the load/store instruction, the load/store control circuitry may select as the target cache a further cache other than a private cache associated with the given processor core. In contrast, if the memory contention hint is not provided, a private cache of the given processor core could be selected as the target cache, or if a hardware prediction mechanism is supported for predicting instances of contention, the target cache could be selected based on a prediction made by the hardware prediction mechanism. By selecting the further cache when the memory contention hint is provided, this recognises that, in cases of high contention, it is more likely that overall performance can be improved by selecting a target cache which will be faster to access by other threads, even if slower to access by the thread executing the load/store instruction itself.

In some examples, in response to determining that the target cache level should be the further cache when, prior to processing the load/store instruction, the data for the target cache line is already cached in the private cache associated with the given processor core, the load/store control circuitry may migrate the data for the target cache line from the private cache associated with the given processor core to the further cache. This may be seen as counter-intuitive since it deviates from typical caching policies, where if a cache access from a given processor core hits against valid data in that core's private cache, this would make that cache line more likely to be retained in the private cache to give lower access latency to the given processor core on future accesses. However, when the contention hint instruction signals that it is likely that the target cache line will be highly contended between multiple threads, this indicates that overall performance for a group of contending threads as a whole is likely to be higher if the cache line is migrated to a further cache, as this can reduce latency for future updates from other threads, even if at the expense of performance for a single thread on the given processor core.

For example, the further cache may comprise at least one of:

- a shared cache shared between the given processor core and at least one other caching agent (e.g. another processor core or a hardware accelerator having a private cache). For example, the shared cache could be implemented at a memory system interconnect, point of coherency, or in a memory controller used to manage access to a particular memory storage unit;
- a peer cache which is a private cache associated with another caching agent (e.g. processor core or hardware accelerator) or shared cache which is not associated with the given processor core; and/or
- a cache in a further domain separate from a domain comprising the given processor core. For example, the further domain may be a chiplet separate from the chiplet comprising the given core (the chiplets being chiplets within the same chip or package), or the further domain could be a separate chip from the chip comprising the given core.

It is likely that these examples of further caches will be slower to access for the given processor core that executed the load/store instruction associated with the memory contention hint. However, migrating the cache line to the further cache can benefit performance by reducing latency for other threads accessing the data in cases of high contention.

When the cache line is migrated to the further cache, the migration could happen either before or after the memory access performed in response to the load/store instruction. Performing the access first and then migrating the cache line ready for future accesses from other threads can help reduce latency for the current access performed in response to the load/store instruction.

Alternatively, for other examples, in response to determining that the target cache level should be the further cache when, prior to processing the load/store instruction, the data for the target cache line is already cached in the private cache associated with the given processor core, the load/store control circuitry may select to retain the data for the target cache line in the private cache associated with the given processor core. In this case, there is no pre-emptive migration to the further cache at this time, but instead the migration to the further cache may wait until another thread on a different core actually requests the data.

Hence, it will be appreciated that in some examples, the memory contention hint might be acted upon to cause allocation into a further cache, in cases where the data is not already cached in the private cache of the given processor core, but when the access hits in the private cache of the given processor core (at least when the data is held in an exclusive (unique) coherency state), the memory contention hint may be ignored. Hence, the current coherency state or location of the data in the memory system may be a factor considered (in addition to the presence or absence of the memory contention hint) when determining the target point of the memory system hierarchy at which data should be allocated.

In some examples, the memory contention hint specifies a target domain selected from among a plurality of domains of a processing system comprising the given processor core, and the load/store control circuitry is configured to select a cache within the target domain as the target point of the memory system hierarchy. For example, the domains may correspond to regions of an integrated circuit, or could correspond to respective chiplets in a multi-chiplet processing system (e.g. chip or package), or respective stacked dies in a three-dimensionally stacked system involving multiple layers of active logic on respective semiconductor dies stacked on top of each other. In some cases, a given chiplet or die could include more than one domain, so the domain may correspond to a sub-portion of a chiplet or die. In another example, the domains comprise different chips or packages connected to the same circuit board. By specifying a target domain in the memory contention hint, this can further improve performance in various use cases.

One example where specifying a target domain could be useful is cases where a particular thread is likely to need to update a shared variable more frequently than other threads, so that overall performance could be improved by providing a software hint regarding the domain at which the thread needing to update the variable most frequently is to be executed. For example, the target domain indicator could be based on information provided at runtime by an operating system responsible for scheduling threads on a processing system, which may select as the target domain a domain which includes a processor core executing a thread likely to require frequent updates to the shared variable.

Another example where specifying a target domain in the memory contention hint can be useful is in a system with domains where inter-domain communication may be slow in comparison to intra-domain communication. For example, in a multi-chiplet system, the communication link between chiplets may be very slow in comparison to communications within a chiplet, so it may be undesirable for contending threads executing on processor cores on different chiplets to repeatedly cause invalidation of each other's cache entries for a target cache line so that the cache line ping-pongs between a cache on one chiplet and a cache on another chiplet. By specifying a target domain in the memory contention hint, this can cause the data for the target cache line to be installed in a cache in the target domain, with any updates to the shared data for that cache line being applied in that cache in the target domain. This can reduce overall delay in applying updates to the shared data and hence improve overall throughput of updates for the set of threads as a whole.

Hence, by providing a memory contention hint supporting a domain identifier which identifies a particular system domain at which the load/store instruction is to cause allocation of data into a cache, this can further improve performance.

It is possible to support two or more different variants of the memory contention hint, e.g. distinguished by different instruction encodings of the contention hint instruction.

In some examples, the load/store control circuitry is configured to support at least one symmetric variant of the memory contention hint, indicating that the target cache line is likely to be subject to contention for access from multiple threads of processing and that a relative frequency of access to the target cache line from each of the multiple threads is unlikely to be biased towards one particular thread of the multiple threads. In response to detecting that the symmetric memory contention hint is associated with the load/store instruction, the load/store control circuitry is configured to select, as the target point of the memory system hierarchy, a shared cache shared between multiple processor cores. This approach could be useful in software use cases where multiple threads accessing shared data are equally likely to access the shared data, e.g. because each thread uses the same program instruction sequence to access the shared data. If each thread has equal status, it is more likely that allocating the shared data contended for by the threads into a shared cache shared by all participating agents or processor cores, such as a system cache associated with a memory system interconnect or a memory controller cache associated with a memory controller, will benefit performance to a greater extent than if the updates are applied at a private cache associated with a particular processor core or a shared cache associated with only a subset of processing cores that are issuing transactions to the memory location. In this case, subsequent accesses by different processing cores using a symmetric memory contention hint may cause the target cache line to be cached at the shared cache in common with all participating processing cores.

In some examples, the load/store control circuitry may support at least one asymmetric variant of the memory contention hint, indicating that the target cache line is likely to be subject to contention for access from multiple threads of processing and that at least one other thread is likely to access the target cache line more frequently than the program thread comprising the contention hint instruction. In response to detecting that the asymmetric memory contention hint is associated with the load/store instruction, the load/store control circuitry may select, as the target point of the memory system hierarchy, a cache other than the private cache associated with the given processor core (e.g. a shared cache or a peer cache associated with another processor core or shared between a cluster of processor cores not including the given processor core). This approach could be useful to support software use cases where at least one thread is likely to need to update the shared variable more frequently than others. Such bias in the relative importance to performance of updates from different threads could arise, for example, where one thread is a "lock manager" which manages claiming of a lock on behalf of other threads, so that the lock manager is expected to access a shared lock variable more frequently than the other threads, and so overall system performance can be highest if the shared updates are applied at the private cache of a processor core that executes the lock manager. Hence, it could be useful to include, in the program instruction sequence of the other threads expected only occasionally to access the shared data, the contention hint instruction with the asymmetric variant of the memory contention hint, to signal that it may be preferable to allocate the shared data towards a particular cache likely to be accessed with lower latency by a processor core executing the thread expected to update the target cache line most frequently. The asymmetric memory contention hint could, in some examples, specify a domain identifier or cache identifier for enabling a particular peer cache or shared cache to be identified by the load/store control circuitry that is expected to be faster to access for the processor core executing the thread likely to update the shared data most frequently. That identifier may be set at runtime by an operating system responsible for scheduling of the contending threads on processor cores of a processing system.

In some examples, an asymmetric variant of the memory contention hint could include two variants, one that biases away from the given processor core, and one that biases towards the given processor core. This may be useful when there may be multiple processor cores that access the location with greater frequency than other processing cores, and the preferred location to allocate the location may be the shared cache close to all the cores using the "biasing towards" variant of the hint.

It will be appreciated that some implementations may support only one of the symmetric/asymmetric variants of the memory contention hint, in which case it may not be necessary to distinguish between multiple hint variants in the encoding of the contention hint instruction, and the memory contention hint could be treated by default as being either the symmetric variant or the asymmetric variant. Other examples may support both variants, and use an encoding of the contention hint instruction (or an operand of the contention hint instruction) to distinguish which variant is intended for a given instance of the contention hint instruction.

There can be a number of ways of implementing the contention hint instruction which associates the memory contention hint with a load/store instruction.

In some examples, the contention hint instruction comprises a prefix instruction preceding the load/store instruction. In some examples, the prefix instruction may apply the memory contention hint to the immediately following instruction (the next instruction in program order), if that immediately following instruction is a load/store instruction. In other cases, the prefix instruction may apply the hint to more than one subsequent instruction (e.g. the prefix instruction could specify an operand defining the number of subsequent instructions that are to be considered associated with the memory contention hint). Using a prefix instruction can simplify instruction set architecture design, as in some implementations there may not be enough encoding space in the instruction encoding of a load/store instruction to encode the memory contention hint into the encoding of the load/store instruction itself, but there may be some reserved encoding space in the instruction opcode space which could be used to provide the prefix instruction. Also by providing a standalone prefix instruction which can be paired with a subsequent load/store instruction, that prefix instruction can be used in conjunction with a number of different types of load/store instruction as the subsequent load/store instruction, rather than needing to add support for contention-hint-encoding variants to each respective type of load/store instruction. If the prefix instruction is introduced into an existing instruction set (rather than being part of a newly designed instruction set), for backwards compatibility with legacy processor implementations which do not support use of the memory contention hint, the prefix instruction can be selected from a reserved instruction encoding space and so may be treated as a no-operation (NOP) instruction on the legacy processor implementations. On newer processor implementations (such as the apparatus described above), the prefix instruction is interpreted as a software hint that multi-threaded processing behaviours (such as allocation into a shared cache or peer cache, or use of far atomic processing circuitry) are expected to be beneficial.

On the other hand, some instruction set architecture implementations may, if there is sufficient encoding space available, encode the memory contention hint into the load/store instruction itself, so that the same instruction serves as both the load/store instruction and the contention hint instruction. Hence, when the load/store instruction has a first encoding indicating that a given type of load/store operation is to be performed and that the memory contention hint is not associated with the load/store instruction, the load/store control circuitry is configured to determine that the load/store instruction is not associated with the memory contention hint; and when the load/store instruction has a second encoding indicating that said given type of load/store operation is to be performed and that the memory contention hint is associated with the load/store instruction, the load/store control circuitry is configured to determine that the load/store instruction is associated with the memory contention hint, and the contention hint instruction comprises the load/store instruction itself. Compared to use of a prefix instruction, this approach can help improve code density, reducing the number of instructions required for implementing a given program code sequence of operations while supporting the ability to provide the memory contention hint associated with a load/store instruction.

Specific examples are now set out with reference to the drawings.

FIG. 1 shows an example of an apparatus 2, which may for example be a processor core, such as a central processing unit (CPU). The apparatus 2 includes instruction decoding circuitry 4 for decoding instructions fetched from a cache or memory storage unit of a memory system. The instructions are encoded according to a particular instruction set defined by an instruction set architecture (ISA) supported by the apparatus 2. The ISA defines, for each instruction encoding, which operation is represented by the instruction, including the operands of the instruction and the results to be generated in response to the instruction. Based on decoding the instruction, the instruction decoding circuitry 4 generates control signals for controlling processing circuitry 6 to perform the operation represented by the instruction. The processing circuitry 6 includes one or more execution units for executing different classes of instructions. One particular execution unit may be a load/store unit 8 which executes load/store operations in response to load/store instructions decoded by the instruction decoding circuitry 4. It will be appreciated that the processing circuitry 6 may also include other types of execution unit, such as one or more arithmetic/logical units (ALUs) for performing integer or floating-point arithmetic/logical operations, a branch unit for processing branch instructions, and/or a vector processing unit for performing vector processing operations on vector operands providing multiple distinct data elements in one register.

The processor core 2 may be associated with one or more private caches 10, which cache data from the memory system for faster access by the processing circuitry 6. For example, the private caches 10 may include multiple levels of cache with successively increasing capacity and access latency, to trade-off performance against cache capacity—e.g. the private caches may include a level 1 cache and level 2 cache (and in some cases further cache levels), where level 1 is faster to access (but has a smaller capacity) than level 2.

The processor core 2 may also include near atomic processing circuitry 12 for carrying out atomic read-modify-write operations (operations involving reading data for a cache line, modifying the data, and writing the modified data back to the cache line) direct on the cache entry storing data for a particular cache line. The near atomic processing circuitry 12 is labelled as "near" because, in comparison to far atomic processing circuitry located deeper into the memory system (see FIG. 2 discussed below), the near atomic processing circuitry 12 can be accessed with lower latency by the processing circuitry 6. By providing atomic processing circuitry to directly apply read-modify-write operations at the location of a cache, this can improve performance for atomic read-modify-write operations (such as a compare-and-swap operation or load-add operation), because the latency associated with transmitting the read data from the cache 10 to a register of the processing circuitry 6 and transmitting the modified value for the cache line back from the processing circuitry 6 to the cache 10 can be eliminated if the modify operation can be performed by the near atomic processing circuitry 12 rather than on an ALU of the processing circuitry 6. A "cache line" refers to a unit of data stored in the memory system, where the size of the cache line corresponds to the granularity with which data is transferred between cache levels or between a cache and memory.

As shown in FIG. 1, load/store control circuitry 9 is provided for selecting the level of the memory system hierarchy at which data for a target cache line accessed by a given load/store operation is to be installed in a cache. While the load/store control circuitry 9 is shown in FIG. 1 as a component of the processor core 2 (e.g. the load/store control circuitry 9 could be implemented at the load/store unit 8, and/or at the private cache 10), as discussed below, the load/store control circuitry 9 could also include circuit logic disposed in other parts of a processing system outside the processor core 2.

FIG. 1 is a greatly simplified view and it will be understood that a processor core 2 may include many other elements not shown in FIG. 1 for conciseness.

Figure 2:
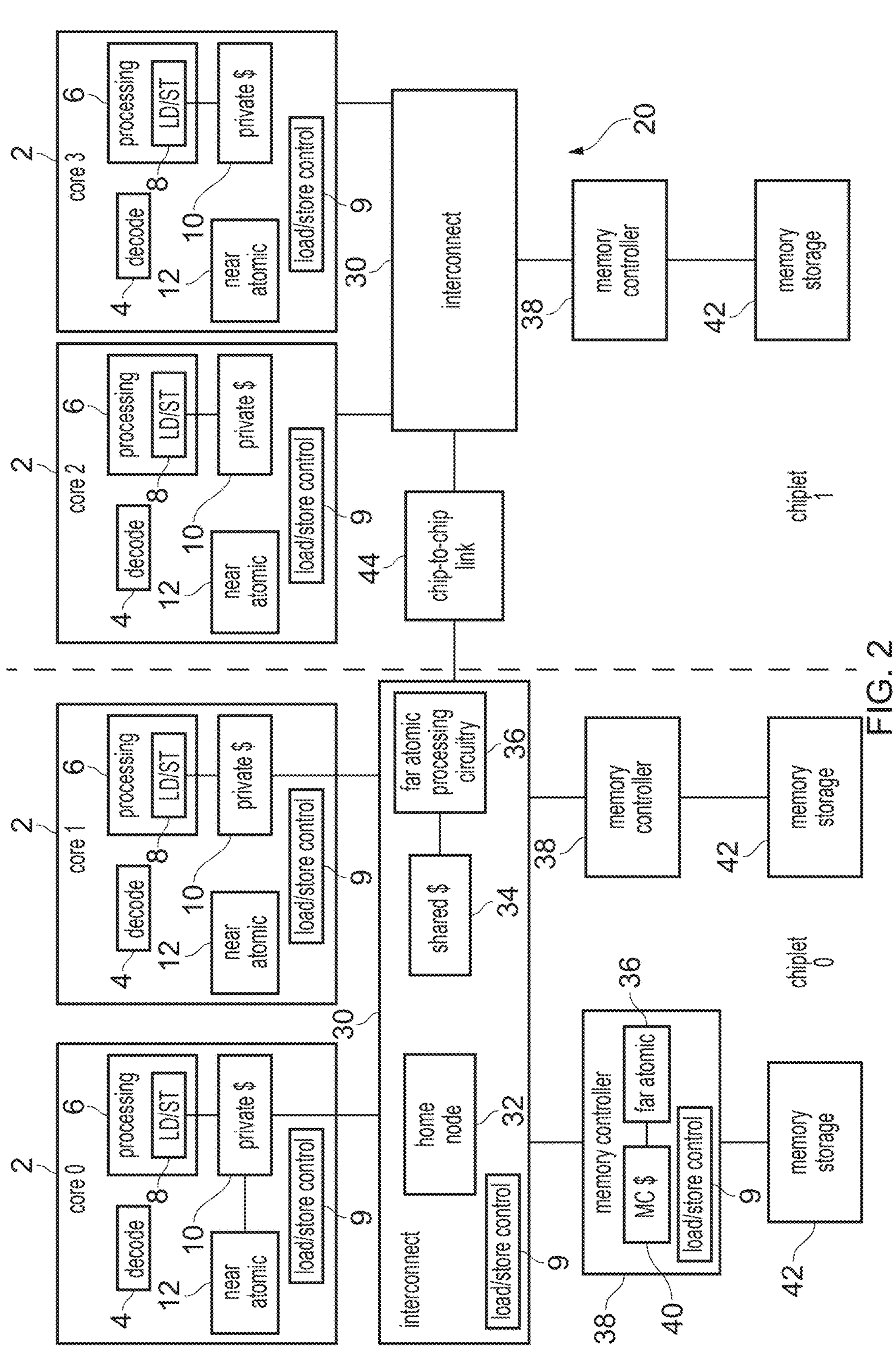
FIG. 2 illustrates an example of a processing system comprising at least one processor core having the instruction decoding circuitry and the load/store control circuitry.

FIG. 2 illustrates a data processing system 20 including at least one instance of the processor core 2 of FIG. 1. In this example, the system 20 includes four processor cores 2 each having the instruction decoding circuitry 4, processing circuitry 6, load/store unit 8, private cache(s) 10 and near atomic processing circuitry 12 as discussed with respect to FIG. 1.

The processor cores 2 each access a shared memory system via a memory system interconnect 30, which in this example is a coherent interconnect operating a coherency protocol to maintain coherency between data cached in the respective private caches 10 of each processor core 2 and any other caching agent which is capable of holding cached data in a dirty state in which the data differs from underlying data in memory (although not shown in FIG. 2, other examples of caching agents could include graphics processing units (GPUs), hardware accelerators, or input/output devices).

The interconnect 30 has home node circuitry 32 which implements a given coherency protocol, which defines a set of cache coherence transaction types and response protocols associated with those transaction types. Each address may, with respect to a particular caching agent, be considered to be held in that caching agent's private cache 10 in a particular coherency state. For example, the coherency state may specify, with respect to a given address and a given caching agent 2, whether valid data for that address is held at the given caching agent's private cache 10, and if valid data is held, whether that data is clean or dirty, and/or is held in an exclusive (unique) or shared state (exclusive data being held exclusively in that caching agent's private cache 10, and not in other caching agent's private caches 10, while shared data is capable of being held in private caches of two or more caching agents simultaneously). When data is held in an exclusive state, the caching agent holding the data as exclusive is allowed to write to the data in the cache without first issuing coherence transactions to check with the home node 32 whether other caching agents could also be holding the data. When the data is held in a shared state, any write to the shared data in a given caching agent's private cache would require first issuing a coherence transaction to check with the home node 32 whether there are conflicting copies in other caches 10 (e.g. that coherence transaction may typically be a request that the data in the given caching agent's private cache 10 is upgraded to the exclusive coherency state, which may cause the home node 32 to send snoop requests to any other agents holding that data to trigger invalidation of data from those caching agents' private caches 10).

The home node circuitry 32 also manages any system level cache (SLC) or last-level cache (LLC), which is a shared cache 34, shared between multiple caching agents 2. The shared cache 34 is also part of the coherency scheme managed by the home node circuitry 32. The shared cache 34 can be updated (e.g. by far atomic operations) without having to bring the cache line to a processor in the exclusive state, by using far atomic processing circuitry 36 which can perform atomic read-modify-write operations on the data cached in the shared cache 34 without requiring the data to first be transferred up to an individual processor core 2. The far atomic processing circuitry 36 can be beneficial in cases when multiple threads executing on different processor cores 2 contend for performing such atomic updates on shared data.

The coherency protocol implemented by the home node circuitry 32 may require that certain coherence transaction types or responses to such transactions may be associated with certain transitions of coherency state for cached items of data associated with the target address of the request. When a read/write coherence transaction is received from one of the caching agents 2 requesting a read/write operation to a given physical address, the home node circuitry 32 issues snoop requests to one or more other caching agents 2 that could potentially hold valid cached data for that physical address. A snoop request may query the current coherency state of the cached data for a specified address at a corresponding caching agent, and/or trigger changes in coherency state at the caching agent. For example, a change of coherency state triggered by a snoop request could include any of: invalidating cached data if the requester of the original read/write request requires the data to be cached in the unique state in its cache; causing return of dirty data held in a snooped caching agent's cache 10 so that the dirty data can be made accessible to the requester which sent the read/write request; and/or downgrading the coherency state of cached data for the specified address from exclusive to shared.

Although not shown in FIG. 1, the home node circuitry 32 may be associated with a snoop filter for tracking (at least partially) which data addresses are cached at certain caching agents 2. The snoop filter can be used to reduce snoop traffic by allowing the home node circuitry 32 to determine when data is not cached at a particular requester. In some cases, the snoop filter may be combined with the shared cache 34 so that a single lookup process for querying a combined data structure returns both any cached data and associated snoop filter information indicating any caching agents 2 that are known not to be holding valid cached data for the associated address (and so which do not need to be snooped when another caching agent 2 accesses the same cache line).

The interconnect 30 is also responsible for issuing memory access transactions to a memory controller 38 which generates corresponding storage access requests to memory storage 42 (the memory controller 38 may convert the interconnect protocol transactions generated by the interconnect 30 into storage-structure-specific requests for interacting with a specific memory cell array within the memory storage 42). The memory controller 38 may include a memory controller cache 40 and, in some cases, a further instance of far atomic processing circuitry 36 for performing atomic read-modify-write operations on data cached in the memory controller cache 40. It is not essential that the memory controller cache 40 and/or far atomic processing circuitry 36 are included for all instances of memory controllers 38 within the processing system 20.

As shown in FIG. 2, load/store control circuitry 9 can be provided at one or more locations in the processing system 20, for determining the level of the memory system hierarchy at which to allocate data for a target cache line accessed by a given load/store operation triggered by a load/store instruction executed at a given processor core 2. In some cases, the load/store control circuitry 9 could include distributed processing logic implemented at two or more locations around the processing system 20. For example, the load/store control circuitry 2 could include circuitry at any one or more of the following locations:

the load/store unit 8;

the private cache 10 of a given processor core 2;

the interconnect 30 or the home node circuitry 32;

the shared cache 34; and/or the memory controller 38.

It is not essential for load/store control circuitry 9 to be implemented at all of these locations. It will be appreciated that the location of the circuitry used to determine which level of the hierarchy to allocate cached data can vary significantly from one implementation to another.

In the particular example of FIG. 2, the processor cores 2 are distributed across multiple chiplets (each chiplet comprising an integrated circuit formed on a separate semiconductor die), with cores 0 and 1 disposed on chiplet 0 and cores 2 and 3 disposed on chiplet 1 in this example. The respective memory system interconnects 30 on each chiplets communicate via a chip-to-chip link 44. Use of chiplets can be helpful to allow for different semiconductor manufacturing nodes to be used to manufacture different portions of the system (e.g. reducing cost by manufacturing portions of the system which are less critical to performance at a less advanced manufacturing node), and can improve manufacturing yields by reducing the complexity on any one chiplet to reduce the probability that a given chiplet is faulty in manufacture compared to if the more complex whole system was implemented on a single die. It will be appreciated that the multi-chiplet system shown in FIG. 2 is just one example, and the use of memory contention hints discussed in this application could also be applied to single-chiplet systems. The chiplets shown in FIG. 2 are one example of a system 20 comprising a number of distinct processing domains. Another example could be where the system-on-chip components are distributed on a number of three-dimensionally stacked dies.

In a system comprising multiple processors 2 with coherent access to shared memory, one type of software workload which may be executed on the processors 2 may be a shared memory function where multiple software threads need to perform shared data updates (e.g. atomic read/modify/write updates) on shared data in memory. For example, a sequence to be performed by each thread may include a read of a shared memory location, one or more operations dependent on the read data to generate a modified value, and a write of the modified value to the shared memory location. If multiple threads perform this sequence on the same shared memory location, with the read from a first thread occurring in the time between the read and the write from a second thread, there is a risk of a synchronisation error because the modified write data from the second thread could be lost if it is subsequently overwritten with modified data from the first thread which was based on the original value of the shared memory location prior to it being read by either the first or second threads, rather than based on the modified write data from the second thread being read as the read data for the first thread. Therefore, software developers developing software which is to have multiple threads interacting with shared data may design shared data update algorithms to avoid this problem by including protective measures designed to prevent, or at least check for, cases where the shared data has changed in the time between the read and the write of the atomic read-modify-write sequence for a given thread. One way to implement this is to use atomic-read-modify-write instructions which are treated as a single indivisible operation, processed as a unitary operation by one of the instances of near atomic processing circuitry 12 or far atomic processing circuitry 36 within the processing system 2 so that the update can be applied directly to data held in a cache 10, 34, 40 rather than needing to use an ALU of the processing circuitry 6 to generate the modified data. Another technique can be that a lock variable is defined which is used by threads to check whether they have the right to continue with operations which will modify the shared data. Updates to such a lock variable may be performed using an atomic read-modify-write operation such as a compare-and-swap operation (for which the modification comprises determining whether the read data for the cache line satisfies a condition, and if so substituting the read data for a swap value written back to the cache line), a load-add operation (for which the modification comprises adding a value to the read data for the cache line to generate the modified value to be written back), or a load-set operation, which writes back the data for the cache line with one or more bits modified to be set to 1. For each of the compare-and-swap operation, load-add operation and load-set operation, the original value read from the cache line may be returned to the processor core that executed the instruction so that the thread can determine whether the lock was successfully acquired. For other examples of atomic read-modify-write operation, it may not be required to return the read value to the processor core.

When a load/store instruction (e.g. an atomic read-modify-write (RMW) instruction, or a standalone load instruction or store instruction) specifying a target cache line to be read/written is executed on a given processor core 2, the corresponding load/store operation may be handled in a number of different ways. On the one hand, the load/store operation could be applied locally at the private cache 10 of the given processor core 2, causing the data to be allocated into the private cache 10 in an exclusive (unique) coherency state and causing other copies to be invalidated at other private caches 10, to allow subsequent updates to the target cache line to be performed with reduced latency if needed again by the thread which is executing on the given processor core 2. If an atomic RMW operation is required, this can be processed using the near atomic processing circuitry 12 of the given processor core 2 which executes the thread comprising the load/store instruction. This approach can be seen as a "single-threaded" load/store handling approach, in the sense that allocating the data at a point of the memory system hierarchy that is close to the given processor core 2 (e.g. a level 1 or level 2 private cache 10 of that core 2) will tend to improve performance for a single thread if it is executing without contention for access to the target cache line from other threads.

On the other hand, the load/store operation could be applied at a point of the memory system hierarchy deeper into the memory system (relative to the given processor core 2 that executes the load/store instruction), e.g. at a shared cache 34, 40 shared between multiple processor cores 2, or at a peer cache (a private cache 10 of another processor core 2 other than the given processor core that executed the load/store instruction). If an atomic RMW operation is required, this can be processed using atomic processing circuitry 36 which is "far" from the given processor core, e.g. the far atomic processing circuitry 36 implemented at the interconnect 30 or the memory controller 38, or the near atomic processing circuitry 12 of another processor core 2 other than the given processor core. This approach can be seen as a "multi-threaded" load/store handling approach, in the sense that it is prioritising improving future access latency for other threads executing on other cores, rather than prioritising improvements in access latency for the thread including the current load/store operation which is executing on the given processor core 2.

In practice, for some load/store instructions within a given thread, the single-threaded approach is preferred. For example, some load/store operations may access thread-private data that is exclusive to the current thread and is not shared with other threads, so contention will not occur. However, for other load/store instructions within the given thread, the single-threaded approach may greatly harm performance in cases where there are multiple threads contending for access to the shared data. For example, the load/store instructions which attempt to check or claim a lock may target cache lines which are heavily contended. If the single-threaded approach is used for those accesses, there may be frequent occurrences of one processor core 2 pulling the data from the target cache line into its private cache 10 in an exclusive (unique) coherency state, only for that cache entry to be invalidated due to another thread on a different core 2 trying to perform the same operation, so that there is much wasted latency and memory system bandwidth associated with the cache line ping-ponging between different private caches 10, and all of the threads struggle to make forward progress. For such load/store instructions, it can be more beneficial to overall system performance (e.g. to increase the overall rate of updates to the shared data from the multiple threads as a whole) if a "multi-thread" load/store handling approach is taken where any shared updates such as atomic RMW operations are applied at a location further from the given processor core issuing the update, such as at the shared cache 34 or memory controller cache 40, rather than attempting to allocate the data into the private cache 10 of the given processor core 2. This can tend to prioritise reducing latency for subsequent accesses from other threads over reducing latency for the thread on the given processor core 2 itself.

Hence, the preferred approach for handling load/store operation may vary greatly from one load/store instruction to another, and an approach that works for one instruction may be harmful to performance when applied to another. However, it may be very difficult for prediction circuitry implemented in hardware within the processing system to learn accurately which particular addresses are those subject to greatest contention (e.g. based on tracking, for particular addresses of cache lines, rates of invalidating snoops which are sent from the home node circuitry 32 to cause invalidation of a cache entry for the cache line due to another core 2 having requested exclusive access to the data). Address access behaviours may be transient and so by the time the prediction logic has encountered sufficient examples of contention to be confident in predicting that it would be beneficial to handle future accesses to that address using far atomic processing circuitry 36 (or to allocate the cache data into a shared cache 34 rather than attempting to allocate in a private cache 10), the behaviour may change, limiting the number of accesses that can benefit from that prediction.

The inventors have recognised that the software developer or compiler generating the instructions executed in a particular program thread is in a position to recognise which particular load/store instructions are likely to benefit from a "multi-thread" approach because they are likely to be subject to contention from other threads, and which load/store instructions are likely to benefit more from the "single-thread" approach because they are unlikely to be contending with accesses to the same cache line from other threads. Hence, by providing, in the instruction set supported by the instruction decoding circuitry 4, at least one variant of a contention hint instruction which enables expression of a software-specified memory contention hint indicating that a target cache line of an associated load/store instruction is likely to be subject to contention from multiple threads, this provides a mechanism by which software can indicate to the hardware of the load/store control circuitry 9 in a given processor core whether it is likely that a multi-thread approach could be beneficial to performance.

The load/store control circuitry 9 may select the point of the memory system hierarchy at which to allocate cached data for the target cache line of a given load/store instruction based on whether that load/store instruction is associated with the memory contention hint provided by the contention hint instruction. For example, for a given load/store operation triggered by a load/store instruction executed by the processing circuitry 6 of a given processor core 2, the load/store control circuitry 9 may select which level of cache is allocated with data for the target cache line of that load/store operation (e.g. selecting between the private cache 10 of the given processor core 2, shared cache 34, memory controller cache 40, or peer cache corresponding to the private cache 10 of another processor core other than the given core), based on whether or not the load/store instruction is associated with the memory contention hint. Similarly, for an atomic RMW instruction, the selection of which instance of atomic processing circuitry 12, 36 to use to process the RMW operation can depend on the presence/absence of the memory contention hint for the corresponding atomic RMW instruction. The selected point of the memory system hierarchy at which to allocate cached data and/or use atomic processing circuitry may be biased towards points further from the given processor core when the memory contention hint is present (e.g. preferring allocation into a shared cache 34, 40 or peer cache, or use of far atomic processing circuitry 36 in a shared location or a peer core's 2 near atomic processing circuitry 12, in cases when the memory contention hint is provided). In contrast, in cases where the memory contention hint is not provided, the selected point of the memory system hierarchy may be more likely to be closer to the given processor core (e.g. allocating data into the private cache 10 of the given processor core 2 and/or using the near atomic processing circuitry 12 of that core 2).

Note that, in absence of the memory contention hint, it is possible that other hardware-specific mechanisms may be used to predict the best approach to handle the load/store operation, e.g. selecting between the "single-thread" and "multi-thread" approaches based on a prediction of whether there is likely to be contention, as generated by a hardware micro-architectural predictor which tracks rates of invalidating snoops to respective addresses to predict instances of heavily contended addresses. In the case where the memory contention hint is provided by software, such predictions by the hardware predictor may be overridden as the software hint is likely to be more reliable than the prediction provided by the hardware predictor.

Figure 3:
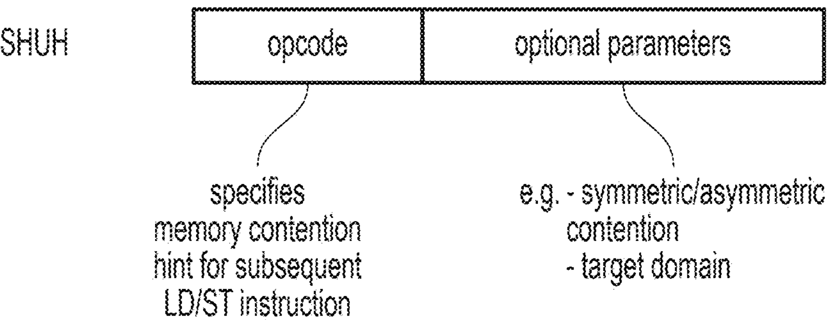
FIGS. 3 to 5 illustrate examples of a contention hint instruction.

FIG. 3 shows a first example of a contention hint instruction which could be used to provide the memory contention hint. In this example, the contention hint instruction is a "shared update hint" (SHUH) prefix instruction architecturally defined as an instruction which signals to the hardware of the processing system that, if the next instruction in program order after the SHUH prefix instruction is a load/store instruction, the target cache line identified based on a target address of the load/store instruction is to a location that is likely to be subsequently updated by threads executing at other cores 2, so there is a performance benefit from ensuring subsequent memory updates to the location may be performed with reduced latency. In this example, the memory contention hint is associated with a single instruction immediately after the SHUH prefix instruction in program order, but other variants could include a parameter in the SHUH instruction specifying how many subsequent instructions are to be associated with the memory contention hint, so that a variable number of instructions can be given the memory contention hint based on a single SHUH prefix instruction. The SHUH prefix instruction behaves architecturally as a "no-operation" (NOP) instruction, in that it does not cause any change to architectural registers or data in architectural memory, but merely provides a hint that hardware can observe to help improve performance. If the SHUH prefix instruction is being added into an existing instruction set already implemented on existing processors, the opcode of the SHUH prefix instruction could be selected from reserved encoding space not previously used for any valid instruction supported in the instruction set, so that legacy processors not supporting the use of the memory contention hint can treat the instruction as a NOP and simply ignore the hint. Alternatively, the SHUH prefix instruction could be implemented in a brand new instruction set that does not need to consider compatibility with legacy processors, in which case the opcode of the SHUH prefix instruction can take any arbitrarily chosen value.

In some cases, the SHUH prefix instruction need not specify any other parameters, other than an opcode identifying that this instruction should be treated as the contention hint instruction providing the memory contention hint described above.

However, in other examples the SHUH prefix instruction could also specify other parameters (either expressed using the opcode itself, or using a separate field of the instruction encoding, or using a value in a register referenced by a register identifier field of the instruction encoding). For example, the SHUH prefix instruction could specify a parameter indicating whether the contention indicated by the hint is likely to be a case of symmetric contention or asymmetric contention. Here, symmetric contention refers to a scenario where there is no particular bias expected between the relative rates at which each contending thread accesses the shared data for the target cache line accessed by the associated load/store instruction, while asymmetric contention refers to a scenario where the target cache line is likely to be accessed more frequently by a particular thread than other contending threads. Information on whether contention is likely to be symmetric or asymmetric could be useful to the hardware in determining whether it is more beneficial to select a point of the memory system hierarchy which is shared between multiple cores 2 (e.g. a shared cache 34, 40 or far atomic processing circuitry 36) or to select a private cache 10 or near atomic processing circuitry 12 which is located at a peer core 2 other than the given core 2 executing the SHUH prefix instruction.

Another example of an additional parameter that can be specified by the hint is a target domain identifier which identifies a target domain (one of a number of system domains of the processing system 20). For example, the system domains could correspond to different chiplets, or to different die layers in a three-dimensionally stacked integrated circuit product (or in some cases multiple domains may be provided on the same chiplet or die). The target domain identifier can be useful to cause a shared data update to be applied at a location in a particular domain, which can improve performance for contending threads in a multi-chiplet system because it reduces the instances of the data crossing back and forth across a relatively slow chip-to-chip link 44 when respective cores 2 in different chiplets try to pull the data into their private caches 10.

It will be appreciated that the additional hint parameters described above are optional, and some implementations may simply define a single type of hint instruction that defines a certain default hint (e.g. defaulting to a symmetric contention hint that indicates a preference for load/store operations to be applied at a shared point of the memory system hierarchy rather than a location private to any particular core 2).

One usage example where the SHUH instruction could be useful could be when thread barriers are used. Thread barriers provide a synchronization point that ensures that all threads of execution have reached that point before any participating threads continue execution. Barriers are common between parallel sections of code in various applications. A typical barrier implementation might include a counting variable to detect when all threads have reached the synchronization point. Below is an example of a code section that operates on this count value while detecting the last synchronizing thread (here the LDADD operation means an atomic RMW operation where the value of the target cache line is read, the read value is incremented by adding 1, and the modified value obtained in the addition is written back to the cache line, as well as returning the old value of the target cache line to the processor core 2 that requested the LDADD):

1. MOV w8, #-1; Set the increment value
2. LDADDAL w9, w8, [x8]; Perform LDADD with acquire-release semantics (this defines a memory barrier operation which restricts ordering of subsequent memory operations with respect to the LDADD)
3. ADD w8, w8, w9; Update local copy to reflect the updated value
4. CBNZ w8, <set FLAG>; identify last thread based on return value In absence of support for the memory contention hint, it is likely that many cores 2 executing this thread would attempt to pull the cache line identified by the address operand [x8] of the LDADDAL instruction into their local private cache 10 in a "unique" coherency state, which means each time one of the threads reaches the LDADDAL instruction, this will trigger invalidations of any entries for the same address cached in other core's private caches 10. There is likely to be ping-ponging of the line back and forth between different private caches 10, causing delays and wasting memory system bandwidth without making much forward progress.

In contrast, the contention hint instruction (SHUH) can be included just before the LDADDAL instruction, as follows:

1. MOV w8, #-1; Set the increment value
2. SHUH; hint that next LDADD instruction is subject to contention
3. LDADDAL w9, w8, [x8]; Perform LDADD with acquire-release semantics (this defines a; memory barrier operation which restricts ordering of subsequent memory operations with respect to the LDADD)
4. ADD w8, w8, w9; Update local copy to reflect the updated value 5. CBNZ w8, <set FLAG>; identify last thread based on return value Hence, the hardware now has knowledge that optimising the latency for future accesses by the same thread to the address identified by [x8] is likely to harm performance for other threads, and can switch to a "multi-thread" approach which favours reducing latency for future accesses to the same address by other threads. For example, the LDADDAL instruction may cause data for the corresponding cache line to be installed in a shared cache 34, 40 or peer cache 10 of another core, and the atomic RMW operation for the LDADDAL instruction may be performed using the far atomic processing circuitry 36 at a shared location. If the data for that cache line is already held in a "Unique" state in the private cache 10 of the given processor core 2 executing the SHUH instruction, the line may be invalidated at the given processor core 2 and migrated to another cache (e.g. shared cache 34) that is faster to access for another processor core 2, to pre-empt the likely future access from another core 2 so that at the point that core accesses the line, the latency of negotiating with the given processor core 2 to invalidate the "Unique" cache entry in the given core's private cache 10 can be avoided. Hence, with this approach, if multiple threads of execution reach this code concurrently, their overall update throughput can be enhanced because each update is done in a manner which tries to improve latency of subsequent updates from other threads in preference to improving latency of subsequent updates from the same thread.

The example above is just one usage example, and other usage examples are also possible. The specific usage may depend on software requirements. A benefit of the use of a prefix instruction is that it can be generic to a variety of subsequent instruction types as the following load/store instruction whose action is modified based on the hint provided by the prefix instruction (rather than needing to provide dedicated "hint-specifying" variants of each distinct load/store instruction type).

Figure 4:
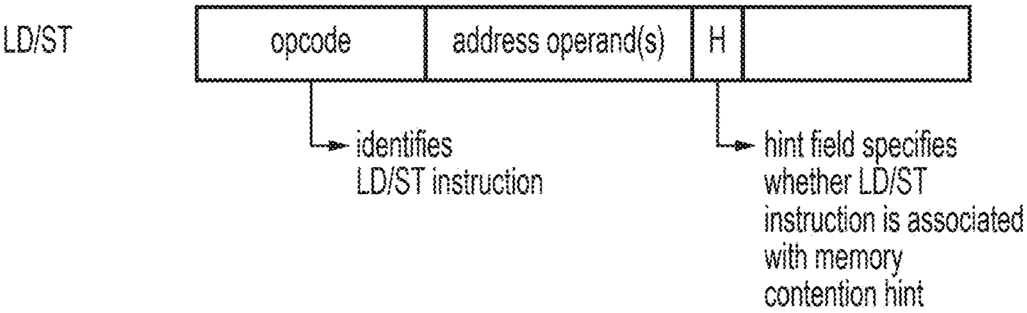
Figure 5:
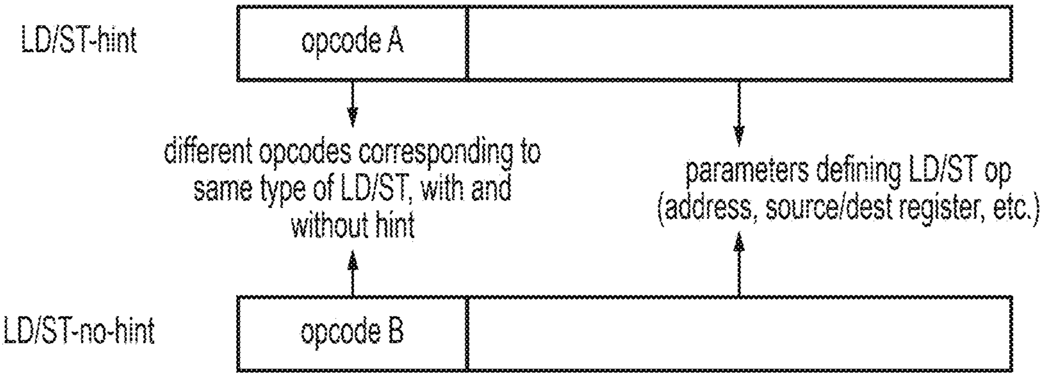

However, as shown in FIGS. 4 and 5, it is also possible to encode the memory contention hint into the load/store instruction itself. In this case, in the case where the memory contention hint is specified, a single instruction behaves as both a load/store instruction and the contention hint instruction.

For example, as shown in FIG. 4, a load/store instruction having a given opcode identifying that this is a load/store instruction may, in addition to its address operands defining the target cache line and any other parameters of the load/store operation (such as a source or destination register), also specify a hint field which specifies whether the load/store instruction should be considered as being associated with the memory contention hint.

Alternatively, as shown in FIG. 5, the memory contention hint could be encoded using the opcode of the load/store instruction, such that two (or more) different opcodes are allocated in the instruction set for the same type of load/store operation, including at least one opcode instructing that type of load/store operation when associated with the memory contention hint, and at least one other opcode instructing that same type of load/store operation when not associated with the memory contention hint.

Hence, it will be appreciated that there are a variety of ways in which a contention hint instruction could be encoded, to allow software to associate the memory contention hint with a particular load/store instruction, either by combining the contention hint instruction with the load/store instruction itself, or by defining the contention hint instruction as a separate instruction, such as a prefix instruction, with an architecturally defined policy as to which subsequent load/store instructions are to be associated with the hint encoded by the contention hint instruction. The advantages of providing a contention hint as described above are not dependent on any particular way of encoding that hint.

FIGS. 6 to 11 show a number of examples of processing a load/store instruction based on whether or not a memory contention hint has been associated with that load/store instruction. FIG. 6 shows a method for processing a load/store instruction, which could be a load instruction, a store instruction, or an atomic RMW instruction. At step 100, the load/store instruction is decoded by the instruction decoding circuitry 4 of a given processor core 2. At step 102, in response to the decoded load/store instruction, the load/store control circuitry 9 selects a target point of the memory system hierarchy at which to allocate data for the target cache lines specified by the load/store instruction, based (at least) on whether the load/store instruction is associated with a memory contention hint provided by a contention hint instruction. In some examples, other information (other than the memory contention hint) may also be considered when selecting the target point of the memory system hierarchy. For example, the selection of the memory system hierarchy could also depend on a current location and/or coherency state of the target cache line at the time the load/store instruction is executed.

FIG. 7 shows a method for processing a store instruction, which could be a stand-alone store instruction where the store is not part of a read-modify-write operation, or could be an atomic RMW instruction. At step 104, the store instruction is decoded by the instruction decoding circuitry 4 of a given processor core 2. At step 106, in response to the decoded store instruction, the load/store control circuitry 9 selects a target point of the memory system hierarchy at which to apply an update to the target cache line in response to the store instruction, based on whether the store instruction is associated with a shared update hint (a particular example of the memory contention hint) provided by a contention hint instruction.

Figure 8:
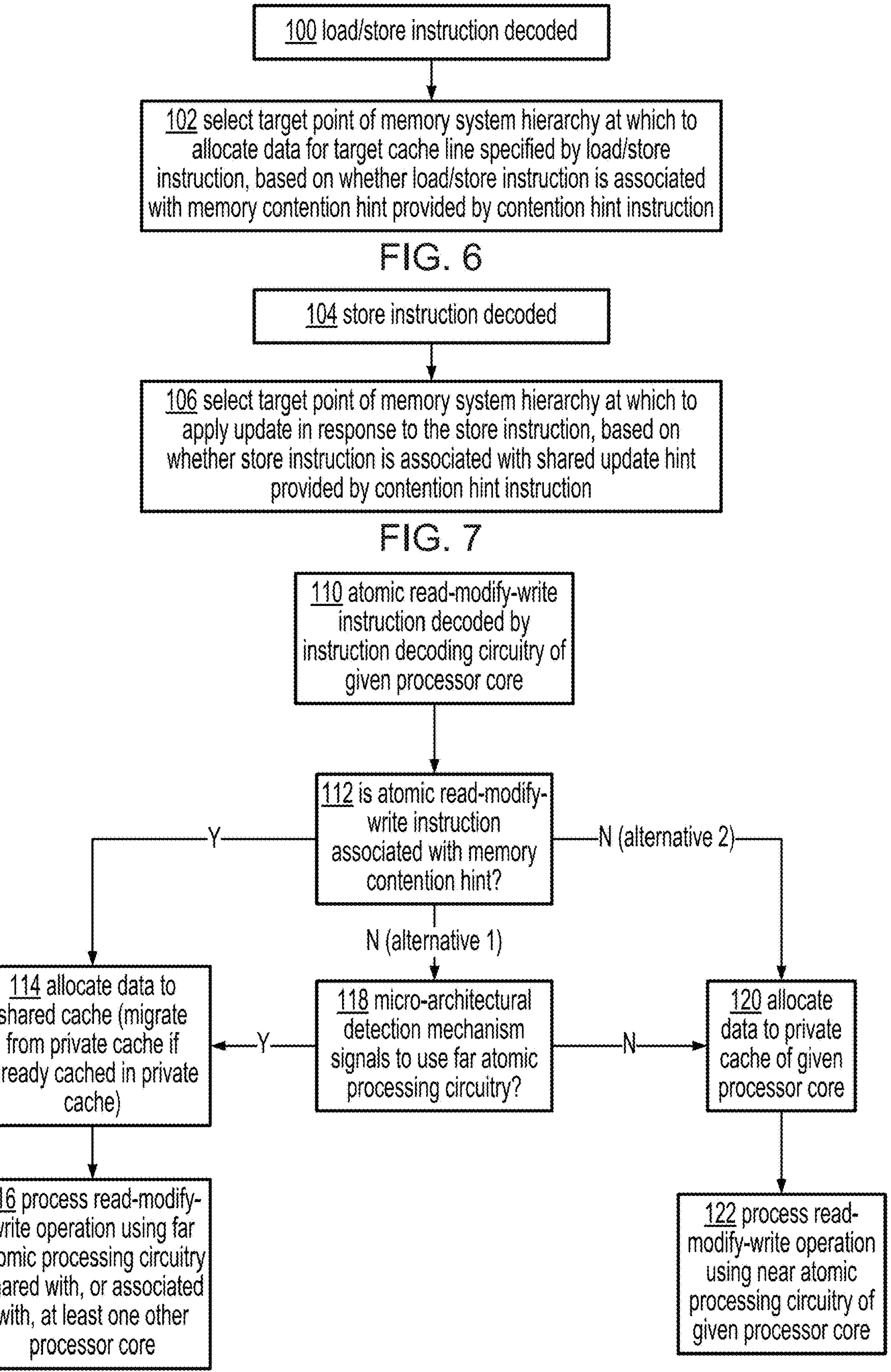
FIG. 8 illustrates a method for processing an atomic read-modify-write instruction based on whether the atomic read-modify-write instruction is associated with the memory contention hint.

FIG. 8 shows a method for processing an atomic RMW instruction in one example. At step 110, the atomic RMW instruction is decoded by the instruction decoding circuitry 4 of a given processor core 2. At step 112, in response to the atomic RMW instruction, the load/store control circuitry 9 determines whether the instruction is associated with the memory contention hint (the hint either being encoded by the atomic RMW instruction acting as contention hint instruction itself or being encoded by a separate contention hint instruction associated with the atomic RMW instruction). If the atomic RMW instruction is associated with the memory contention hint, then at step 114, the load/store control circuitry selects to allocate data for the target cache line into a shared cache 34, 40 shared between multiple processor cores 2. If at this point the data for the target cache line is already held in the private cache 10 of the given processor core 2 (e.g. held in a Unique state), then the data is migrated to the shared cache to avoid the overhead of invalidating the Unique data from the given processor core's cache later if another thread needs to update the data. At step 116, the load/store control circuitry selects to service the atomic RMW operation using far atomic processing circuitry which is shared with, or is associated with, at least one other processor core 2 (e.g. using the far atomic processing circuitry 36 implemented at a shared point of the memory system hierarchy common to multiple processor cores 2, or using the near atomic processing circuitry 36 of another core other than the given processor core 2).

If at step 112 the load/store control circuitry 9 determines that the atomic RMW instruction is not associated with a memory contention hint, then if a micro-architectural detection mechanism for detecting contended memory locations is supported, at step 118 the micro-architectural detection mechanism is used to predict whether far atomic processing circuitry 36 should be used to service the operation. For example, the micro-architectural detection mechanism may default to selecting the operation to be serviced using the near atomic processing circuitry 12 of the given processor core 2, unless it detects based on monitored rates of invalidating snoops to the address of the target cache line that it is likely that the target cache line is subject to contention for shared updates, in which case the far atomic processing circuitry can be used. Hence, if the micro-architectural detection mechanism signals to use the far atomic processing circuitry 36, then again at steps 114, 116 the point of the memory system hierarchy at which data is allocated and the atomic RMW operation performed is a shared point of the hierarchy, as discussed earlier.

If either the micro-architectural detection mechanism signals that the far atomic processing circuitry 36 should not be used, or there is no such micro-architectural detection mechanism (see alternative 2 following step 112 in FIG. 8), then the load/store control circuitry 9 instead selects that the cached data for the target cache line should be allocated closer to the given processor core 2. At step 120, the data is allocated into a private cache 10 of the given processor core, and at step 122 the atomic RMW operation is performed on the data in the private cache 10 using the near atomic processing circuitry 12 of the given processor core 2.

FIG. 9 illustrates a method of using the memory contention hint, in an implementation where the hint specifies a target domain at which the data should be allocated or at which updates should be applied. This could be useful for chiplet-based systems for example, which can severely limit the throughput of memory operations by multiple processor cores 2 operating on the same cache line, due to the latency involved in moving the cache line between chiplets across the chip-to-chip link 44. In scenarios where memory operations, such as store operations or atomic RMW operations which demand read-for-ownership, are performed by processor cores 2 across multiple chiplets, the ability to specify a particular chiplet domain at which the memory update should preferably be applied can significantly enhance performance by reducing the data movement to perform the operation. Hence, at step 130, the load/store control circuitry 9 detects a memory contention hint which is associated with a given load/store instruction, where the hint specifies an identifier of a target domain (e.g. a particular chiplet ID or chiplet sub-region ID). At step 132, the load/store control circuitry 9 selects, as the target point of the memory system hierarchy at which the operation is to be applied, a cache within the target domain identified as a parameter of the contention hint instruction which specifies the memory contention hint.

FIG. 10 illustrates a method of using a symmetric memory contention hint. At step 140 the load/store control circuitry 9 detects that a symmetric memory contention hint is associated with the load/store instruction decoded at a given processor core 2. The symmetric memory contention hint could be detected either by default, in an implementation where all memory contention hints are considered symmetric, or could be detected based on a parameter of the contention hint instruction (e.g. an opcode or other field of the instruction, or a parameter in a register referenced by the instruction) that expresses whether the hint is to be regarded as a symmetric or asymmetric contention hint. At step 142, in response to detecting the symmetric memory contention hint being associated with the load/store instruction, the load/store control circuitry 9 selects, as the target point of the memory system hierarchy at which cached data is to be allocated for the target cache line of the load/store instruction, a shared cache 34, 40 shared between the given processor core that is executing the load/store instruction and at least one other processor core. In cases of symmetric contention with no particular bias towards one thread or other, a shared location is likely to offer best performance to reduce average access latency across all threads.

FIG. 11 illustrates a method of using an asymmetric memory contention hint. At step 150 the load/store control circuitry 9 detects that an asymmetric memory contention hint is associated with the load/store instruction decoded at a given processor core 2. The asymmetric memory contention hint could be detected either by default, in an implementation where all hints are considered asymmetric, or could be detected based on a parameter of the contention hint instruction (e.g. an opcode or other field of the instruction, or a parameter in a register referenced by the instruction) that expresses whether the hint is to be regarded as a symmetric or asymmetric contention hint. At step 152, in response to detecting the asymmetric memory contention hint being associated with the load/store instruction, the load/store control circuitry 9 selects, as the target point of the memory system hierarchy at which cached data is to be allocated for the target cache line of the load/store instruction, a cache other than the private cache 10 of the given processor core 2. For example, the cache selected at step 152 could be a peer cache, which is the private cache 10 associated with another processor core other than the given processor core 2 which executed the load/store instruction. Alternatively, the cache selected at step 152 could be a cluster cache or other shared cache shared between another processor core other than the given processor core and at least one further caching agent (the at least one further caching agent may or may not include the given processor core itself). In cases of asymmetric contention where there is bias towards another thread likely to update the shared data more frequently than other threads, overall update rate from the threads may be better if the data is pushed towards a cache which is faster to access for another processor core than the private cache 10 of the given processor core. The asymmetric contention hint can specify a target domain identifier or cache identifier used to identify which cache is the one that is expected to give best performance (reduced access latency) for the thread which is likely to update the target cache line most often. That target domain identifier or cache identifier can be set based on thread scheduling information provided by an operating system which identifies the processor core at which the thread expected to update the target cache line most often is executing.

Hence, with the techniques discussed herein, the memory contention hint provided by software can be used by the hardware of the processing system 20 to improve selection of the relative point in a memory system hierarchy at which load/store operations (in particular, updates to data shared between multiple threads) are to be applied. Hence, an instruction set architecture supporting the memory contention hint is a better architecture than alternative architectures not supporting the memory contention hint, as it gives the opportunity for software to direct hardware in improving average case performance across the threads. The memory contention hint is a fine-grained hint in the sense that it can be associated with a particular load/store instruction (rather than being a global directive to use, or not use, far atomic processing logic 36, say), so that some load/store instructions can be associated with the hint and others not, allowing software to influence which load/store operations are those which are most likely to benefit from the use of far atomic processing logic 36. Hence, as software is able to identify the load/store instructions most likely to involve contention, these techniques can help to improve overall system performance in a scenario where multiple threads contend for access, while enabling a single-threaded approach to be used for other load/store operations for which allocating into the shared cache or use of far atomic processing logic 36 is unlikely to be beneficial.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 12:
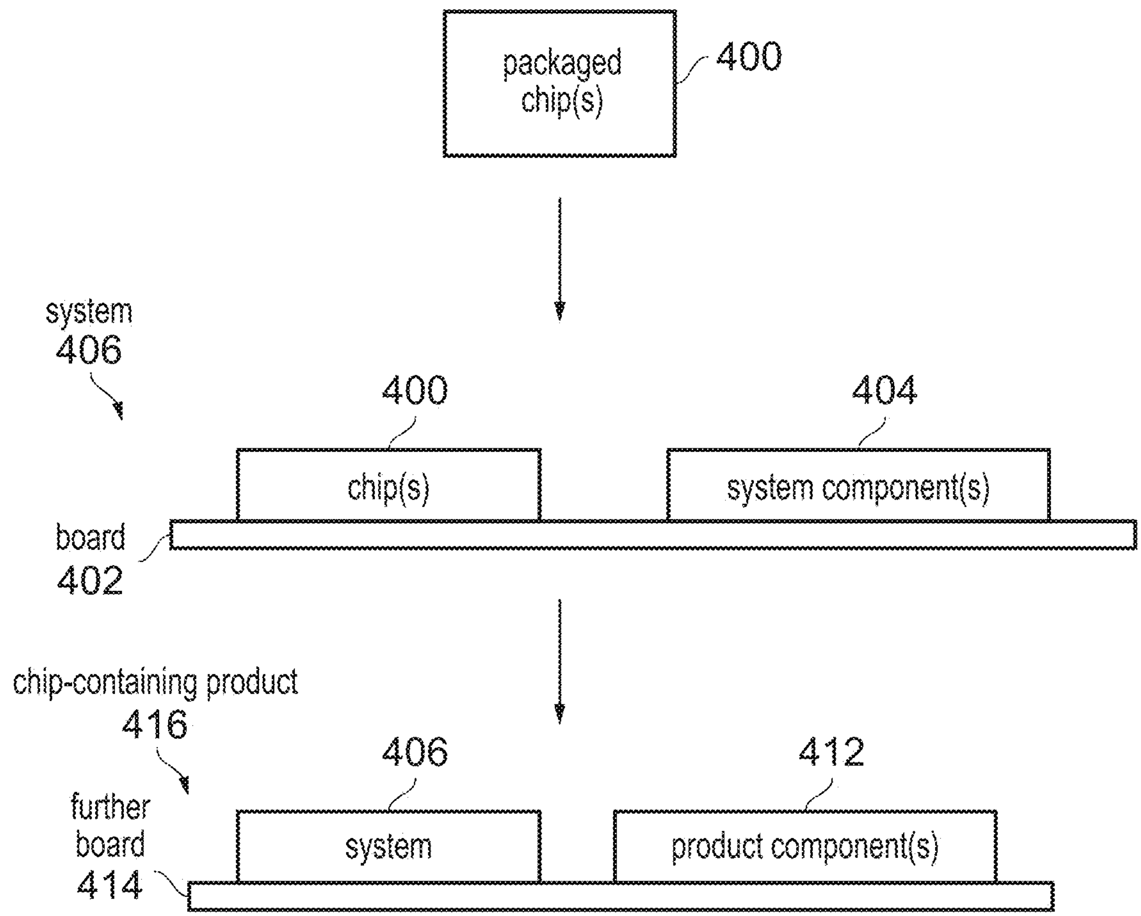
FIG. 12 illustrates a system and a chip-containing product.

As shown in FIG. 12, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material.

The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights. Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   - instruction decoding circuitry configured to decode instructions of a program thread executed by a given processor core; and
   - load/store control circuitry configured to select a target point of a memory system hierarchy at which to allocate data for a target cache line specified by a load/store instruction decoded by the instruction decoding circuitry, wherein the load/store control circuitry is configured to select the target point of the memory system hierarchy depending on whether the load/store instruction is associated with a memory contention hint provided by a contention hint instruction decoded by the instruction decoding circuitry, the memory contention hint indicating that the target cache line is likely to be subject to contention for access from multiple threads of processing.
2. The apparatus according to clause 1, in which the memory contention hint comprises a shared update hint indicating that the target cache line is likely to be subject to updates from multiple threads of processing, and
   - for a store instruction decoded by the instruction decoding circuitry, the load/store control circuitry is configured to determine, based on whether the store instruction is associated with the shared update hint, the target point of the memory system hierarchy at which to apply an update to the target cache line.
3. The apparatus according to any of clauses 1 and 2, in which the load/store instruction comprises an atomic read-modify-write instruction for controlling performance of an atomic read-modify-write operation.
4. The apparatus according to clause 3, in which the load/store control circuitry is configured to determine, based on whether the atomic read-modify-write instruction is associated with the memory contention hint, whether to perform the atomic read-modify-write operation using near atomic processing circuitry associated with the given processor core or far atomic processing circuitry shared with, or associated with, at least one other processor core.
5. The apparatus according to clause 4, in which, in response to detecting that the memory contention hint is associated with the atomic read-modify-write instruction when the target cache line is not already held in a unique coherency state in the private cache of the given processor core, the load/store control circuitry is configured to select the far atomic processing circuitry for performing the atomic read-modify-write operation.
6. The apparatus according to any preceding clause, in which the load/store control circuitry is configured to select, depending on whether the load/store instruction is associated with the memory contention hint, a target cache at which to allocate the data for the target cache line.
7. The apparatus according to clause 6, in which, in response to detecting that the memory contention hint is associated with the load/store instruction, the load/store control circuitry is configured to select as the target cache a further cache other than a private cache associated with the given processor core.
8. The apparatus according to clause 7, in which, in response to determining that the target cache level should be the further cache when, prior to processing the load/store instruction, the data for the target cache line is already cached in the private cache associated with the given processor core, the load/store control circuitry is configured to migrate the data for the target cache line from the private cache associated with the given processor core to the further cache.
9. The apparatus according to any of clauses 7 and 8, in which the further cache comprises at least one of:
   - a shared cache shared between the given processor core and at least one other caching agent;
   - a peer cache which is a private cache associated with another caching agent or a shared cache which is not associated with the given processor core; and/or
   - a cache in a further domain separate from a domain comprising the given processor core.
10. The apparatus according to any preceding clause, in which the memory contention hint specifies a target domain selected from among a plurality of domains of a processing system comprising the given processor core, and the load/store control circuitry is configured to select a cache within the target domain as the target point of the memory system hierarchy.
11. The apparatus according to any preceding clause, in which the load/store control circuitry is configured to support at least one symmetric variant of the memory contention hint, indicating that the target cache line is likely to be subject to contention for access from multiple threads of processing and that a relative frequency of access to the target cache line from each of the multiple threads is unlikely to be biased towards one particular thread of the multiple threads.

12. The apparatus according to clause 11, in which, in response to detecting that the symmetric memory contention hint is associated with the load/store instruction, the load/store control circuitry is configured to select, as the target point of the memory system hierarchy, a shared cache shared between multiple processor cores.

13. The apparatus according to any preceding clause, in which the load/store control circuitry is configured to support at least one asymmetric variant of the memory contention hint, indicating that the target cache line is likely to be subject to contention for access from multiple threads of processing and that at least one other thread is likely to access the target cache line more frequently than the program thread comprising the contention hint instruction.

14. The apparatus according to clause 13, in which, in response to detecting that the asymmetric memory contention hint is associated with the load/store instruction, the load/store control circuitry is configured to select, as the target point of the memory system hierarchy, a cache other than the private cache of the given processor core.

15. The apparatus according to any preceding clause, in which the contention hint instruction comprises a prefix instruction preceding the load/store instruction.

16. The apparatus according to any of clauses 1 to 14, in which:

when the load/store instruction has a first encoding indicating that a given type of load/store operation is to be performed and that the memory contention hint is not associated with the load/store instruction, the load/store control circuitry is configured to determine that the load/store instruction is not associated with the memory contention hint; and when the load/store instruction has a second encoding indicating that said given type of load/store operation is to be performed and that the memory contention hint is associated with the load/store instruction, the load/store control circuitry is configured to determine that the load/store instruction is associated with the memory contention hint, and the contention hint instruction comprises the load/store instruction itself.

17. A system comprising:

the apparatus of any of clauses 1 to 16, implemented in at least one packaged chip;

at least one system component; and a board, wherein the at least one packaged chip and the at least one system component are assembled on the board.

18. A chip-containing product comprising the system of clause 17, wherein the system is assembled on a further board with at least one other product component.

19. Computer-readable code for fabrication of an apparatus comprising:

instruction decoding circuitry configured to decode instructions of a program thread executed by a given processor core; and load/store control circuitry configured to select a target point of a memory system hierarchy at which to allocate data for a target cache line specified by a load/store instruction decoded by the instruction decoding circuitry, wherein the load/store control circuitry is configured to select the target point of the memory system hierarchy depending on whether the load/store instruction is associated with a memory contention hint provided by a contention hint instruction decoded by the instruction decoding circuitry, the memory contention hint indicating that the target cache line is likely to be subject to contention for access from multiple threads of processing.

20. A storage medium storing the computer-readable code of clause 19.

21. A method comprising:

decoding instructions of a program thread executed by a given processor core; and in response to a load/store instruction of the program thread, selecting a target point of a memory system hierarchy at which to allocate data for a target cache line specified by the load/store instruction, wherein the target point of the memory system hierarchy is selected depending on whether the load/store instruction is associated with a memory contention hint provided by a contention hint instruction, the memory contention hint indicating that the target cache line is likely to be subject to contention for access from multiple threads of processing.

In the present application, the words “configured to . . . ” are used to mean that an element of an apparatus has a configuration able to carry out the defined operation. In this context, a “configuration” means an arrangement or manner of interconnection of hardware or software. For example, the apparatus may have dedicated hardware which provides the defined operation, or a processor or other processing device may be programmed to perform the function. “Configured to” does not imply that the apparatus element needs to be changed in any way in order to provide the defined operation.

In the present application, lists of features preceded with the phrase “at least one of” mean that any one or more of those features can be provided either individually or in combination. For example, “at least one of: A, B and C” encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

instruction decoding circuitry configured to decode instructions of a program thread executed by a given processor core; and load/store control circuitry configured to select a target point of a memory system hierarchy at which to allocate data for a target cache line specified by a load/store instruction decoded by the instruction decoding circuitry, wherein the load/store control circuitry is configured to select the target point of the memory system hierarchy depending on whether the load/store instruction is associated with a memory contention hint provided by a contention hint instruction decoded by the instruction decoding circuitry, the memory contention hint indicating that the target cache line is likely to be subject to contention for access from multiple threads of processing.

2. The apparatus according to claim 1, in which the memory contention hint comprises a shared update hint indicating that the target cache line is likely to be subject to updates from multiple threads of processing, and for a store instruction decoded by the instruction decoding circuitry, the load/store control circuitry is configured to determine, based on whether the store instruction is associated with the shared update hint, the target point of the memory system hierarchy at which to apply an update to the target cache line.

3. The apparatus according to claim 1, in which the load/store instruction comprises an atomic read-modify-write instruction for controlling performance of an atomic read-modify-write operation.

4. The apparatus according to claim 3, in which the load/store control circuitry is configured to determine, based on whether the atomic read-modify-write instruction is associated with the memory contention hint, whether to perform the atomic read-modify-write operation using near atomic processing circuitry associated with the given processor core or far atomic processing circuitry shared with, or associated with, at least one other processor core.

5. The apparatus according to claim 4, in which, in response to detecting that the memory contention hint is associated with the atomic read-modify-write instruction when the target cache line is not already held in a unique coherency state in the private cache of the given processor core, the load/store control circuitry is configured to select the far atomic processing circuitry for performing the atomic read-modify-write operation.

6. The apparatus according to claim 1, in which the load/store control circuitry is configured to select, depending on whether the load/store instruction is associated with the memory contention hint, a target cache at which to allocate the data for the target cache line.

7. The apparatus according to claim 6, in which, in response to detecting that the memory contention hint is associated with the load/store instruction, the load/store control circuitry is configured to select as the target cache a further cache other than a private cache associated with the given processor core.

8. The apparatus according to claim 7, in which, in response to determining that the target cache level should be the further cache when, prior to processing the load/store instruction, the data for the target cache line is already cached in the private cache associated with the given processor core, the load/store control circuitry is configured to migrate the data for the target cache line from the private cache associated with the given processor core to the further cache.

9. The apparatus according to claim 7, in which the further cache comprises at least one of:

a shared cache shared between the given processor core and at least one other caching agent;

a peer cache which is a private cache associated with another caching agent or a shared cache which is not associated with the given processor core; and/or a cache in a further domain separate from a domain comprising the given processor core.

10. The apparatus according to claim 1, in which the memory contention hint specifies a target domain selected from among a plurality of domains of a processing system comprising the given processor core, and the load/store control circuitry is configured to select a cache within the target domain as the target point of the memory system hierarchy.

11. The apparatus according to claim 1, in which the load/store control circuitry is configured to support at least one symmetric variant of the memory contention hint, indicating that the target cache line is likely to be subject to contention for access from multiple threads of processing and that a relative frequency of access to the target cache line from each of the multiple threads is unlikely to be biased towards one particular thread of the multiple threads.

12. The apparatus according to claim 11, in which, in response to detecting that the symmetric memory contention hint is associated with the load/store instruction, the load/store control circuitry is configured to select, as the target point of the memory system hierarchy, a shared cache shared between multiple processor cores.

13. The apparatus according to claim 1, in which the load/store control circuitry is configured to support at least one asymmetric variant of the memory contention hint, indicating that the target cache line is likely to be subject to contention for access from multiple threads of processing and that another thread is likely to access the target cache line more frequently than the program thread comprising the contention hint instruction.

14. The apparatus according to claim 13, in which, in response to detecting that the asymmetric memory contention hint is associated with the load/store instruction, the load/store control circuitry is configured to select, as the target point of the memory system hierarchy, a cache other than the private cache of the given processor core.

15. The apparatus according to claim 1, in which the contention hint instruction comprises a prefix instruction preceding the load/store instruction.

16. The apparatus according to claim 1, in which:

when the load/store instruction has a first encoding indicating that a given type of load/store operation is to be performed and that the memory contention hint is not associated with the load/store instruction, the load/store control circuitry is configured to determine that the load/store instruction is not associated with the memory contention hint; and when the load/store instruction has a second encoding indicating that said given type of load/store operation is to be performed and that the memory contention hint is associated with the load/store instruction, the load/store control circuitry is configured to determine that the load/store instruction is associated with the memory contention hint, and the contention hint instruction comprises the load/store instruction itself.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A non-transitory computer-readable medium storing computer-readable code for fabrication of an apparatus comprising:

instruction decoding circuitry configured to decode instructions of a program thread executed by a given processor core; and load/store control circuitry configured to select a target point of a memory system hierarchy at which to allocate data for a target cache line specified by a load/store instruction decoded by the instruction decoding circuitry, wherein the load/store control circuitry is configured to select the target point of the memory system hierarchy depending on whether the load/store instruction is associated with a memory contention hint provided by a contention hint instruction decoded by the instruction decoding circuitry, the memory contention hint indicating that the target cache line is likely to be subject to contention for access from multiple threads of processing.

20. A method comprising:

decoding instructions of a program thread executed by a given processor core; and in response to a load/store instruction of the program thread, selecting a target point of a memory system hierarchy at which to allocate data for a target cache line specified by the load/store instruction, wherein the target point of the memory system hierarchy is selected depending on whether the load/store instruction is associated with a memory contention hint provided by a contention hint instruction, the memory contention hint indicating that the target cache line is likely to be subject to contention for access from multiple threads of processing.

* * * * *